Feb. 10, 1959   W. H. HUGGINS   2,873,425
APPARATUS AND METHOD FOR DETECTING VOIDS
IN DIELECTRIC SHEET MATERIAL
Filed April 24, 1956

United States Patent Office 2,873,425
Patented Feb. 10, 1959

2,873,425

APPARATUS AND METHOD FOR DETECTING VOIDS IN DIELECTRIC SHEET MATERIAL

William H. Huggins, Clinton, Conn.

Application April 24, 1956, Serial No. 580,319

5 Claims. (Cl. 324—54)

This invention relates to apparatus and a method for detecting abrupt changes in the condition of rapidly advancing sheet material of a dielectric type, and particularly for detecting voids, very thin spots, and conducting particles in such material.

An object of the invention is to provide apparatus and a method for detecting voids greater than a selected magnitude in advancing dielectric sheet material, while ignoring smaller ones and ignoring certain other variations in the advancing material. The apparatus of the present invention provides a "size-control" by which the operator may select the size holes, greater than which the apparatus will detect and less than which it will not.

In one of its embodiments, the invention includes a pair of opposed sensing electrodes for yieldably engaging opposite surfaces of a rapidly-advancing sheet of dielectric material, these electrodes being connected in a series circuit with a resistance and a source of D.-C. voltage. A hole or a conducting particle in the material passing between the electrodes produces a transient voltage variation between the electrodes. This voltage variation, which may be in the nature of a voltage pulse, is applied to the first of a series of amplifiers. One of the series of amplifiers, for example, the second, may include adjustable means for applying an adjustable negative voltage to its grid, so as to bias it to an "off" or non-conducting condition. The output of the second amplifier is applied to a third amplifier which controls a relay, which in turn controls an indicating device such as an audible or visible alarm, and, if desired, also a recording device. A significantly large, abrupt change in the material rapidly advancing between the sensing electrodes turns on the biased-off amplifier and actuates the alarm and recording device.

In certain embodiments, the circuit constants associated with the first amplifier may be so arranged that in the absence of a pulse from the sensing electrodes, the amplifier conducts, but when a void occurs, a negative pulse is applied to the control grid of this first amplifier, of sufficient magnitude to turn it off. A condenser is connected in parallel with the vacuum tube of this first amplifier. In the absence of a pulse, this condenser is normally in a relatively uncharged condition. When a void cuts the tube off, however, the condenser charges through a D.-C. circuit including a source of D.-C. voltage and a resistor, so as to produce a rising, approximately sawtooth voltage, having a duration equal to the duration of the negative pulse. The peak amplitude of any given sawtooth variation is determined by the duration of the negative pulse from the electrodes and hence by the magnitude (length) of the void, as measured lengthwise of the advancing sheet of dielectric material. This sawtooth voltage is applied to the control grid of the succeeding biased-off amplifier, and if the hole is large enough, the amplitude of the sawtooth voltage will be great enough to turn this amplifier on, and to actuate the indicating device which indicates a void. The "size-control" is adjusted by adjusting the bias on the biased-off amplifier, thereby making the apparatus responsive to voids having a duration greater than the selected value.

These and other features and objects obtainable by the practice of the present invention will be readily understood by persons skilled in the art by reference to the following detailed description taken in connection with the drawings, which describe and illustrate the invention in certain of its embodiments.

Figure 1:
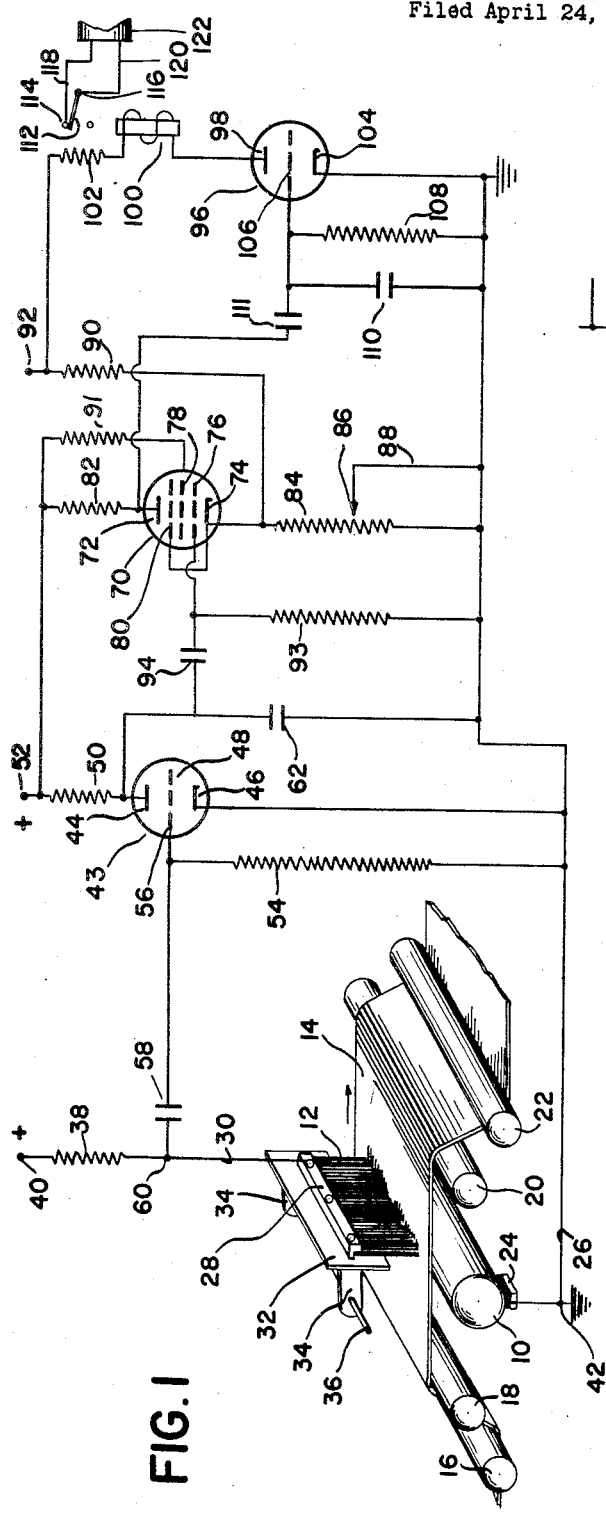
Figure 1 is a schematic circuit diagram of a void detector, with the sensing electrodes shown in perspective.

In the void detector system shown in Figure 1, there is provided a backing roller electrode 10, and an opposed brush electrode 12. The dielectric material 14 passes between the electrodes 10 and 12, and the brush electrode is pressed toward the roller electrode so that these electrodes engage between them the advancing material 14, for example, paper, in which voids or conducting particles are to be detected. The dielectric material is continuously and rapidly advanced by rollers such as 16, 18, 20, and 22. The roller 10 is of metal, so as to be electrically conductive. Electrical connection from this roller to the circuit is made via a small brush electrode 24 and a lead 26, which may be grounded.

The bristles of the brush 12 are of metal, for example, phosphor bronze. They are carried by a metal mounting connection 28, to which a lead 30 is connected. The brush is mounted on a support member 32, of insulating material, which in turn is mounted by supports 34 on a shaft 36. The brush 12 and its supports may be rotated clockwise toward the roller 10 sufficiently to engage the sheet 14.

The electrodes 10 and 12 are connected in series with a resistor 38 and a D.-C. voltage source illustrated as having a positive terminal 40 and a grounded terminal 42. It has been found that a satisfactory D.-C. voltage from the terminal 40 to the terminal 42 is, in certain embodiments, about 50 volts, when the material 14 is paper. In some cases, voltages much less than this value cause the apparatus not to be sufficiently responsive to voids and conducting particles, and voltages much larger cause it to detect bumps and creases, which may not be desired.

There is provided a vacuum tube 43 having an anode 44, a cathode 46, and a control grid 48. The cathode is grounded. The anode is connected through a resistor 50 to a positive terminal 52 of a D.-C. power supply.

Connected between the grid 48 and the grounded cathode is a resistor 54, of, for example, 470,000 ohms.

The grid 48 is coupled by a blocking condenser 58 to a terminal 60 which represents the junction point between the brush electrode 12 and the resistor 38.

In an illustrative arrangement, one brush 12 may be, say, 30 inches in its transverse extent across the dielectric sheet, and if the sheet is wide enough, there may be, for example, three such brushes, all connected to the terminal 60. Hence in such an arrangement these three brushes, each with its many individual bristles, are all effectively connected in parallel between the terminal 60 and the roller electrode 10, and they all control the same circuit of the type shown in Figure 1. In another arrangement, a plurality of brushes like 12 may be used, but each may be provided with its own separate output circuit of the type shown in Figure 1. Hence one or a plurality of brushes may be connected to one channel, or a plurality of brushes may be respectively connected to a corresponding plurality of channels.

The tube 43 is normally in a conducting condition. Connected in parallel with this tube is a condenser 62. This condenser may charge from the D.-C. power supply between the grounded terminal 42 and the positive terminal 52 through the resistor 50, except that when the tube 43 is in a conducting condition, it limits the extent to which the condenser 62 may charge.

When a void or hole in the material passes between the roller electrode 10 and one of the metallic bristles of the brush electrode 12, this creates a very low impedance path, approximating a short circuit, between the terminal 60 and the roller electrode 10. The result is that a negative pulse is applied to the grid 56, cutting off this tube. When this tube cuts off, the condenser 62 charges toward the voltage supplied from the terminal 52, so as to produce an exponential or approximately sawtooth rising voltage variation on the upper plate of the condenser 62. When the trailing end of the void has passed between the electrodes 10 and 12, the short circuit disappears, and this represents the trailing end of the negative pulse on the grid 56. This restores the tube 43 to a conducting condition, and lowers the potential on the upper plate of the condenser 62 to its original value. The amplitude of the sawtooth voltage variation on the condenser 62 is determined by the duration of the negative pulse on the grid 56. On the other hand, because all voids which allow a bristle of the electrode 12 to contact the electrode 10 cut off the tube 43, this tube has a clipping effect. Except for the effect of the condenser 62, the output of this tube would be square-topped or rectangular in wave shape. The magnitude of the sawtooth variation on the condenser 62 is not determined by the magnitude of the negative pulses applied to the grid 56, so long as they cut off the tube 43, but is determined by their duration. This is a desirable feature, because, as will be explained in the subsequent description, it aids in the detection of voids of a predetermined size.

There is provided a vacuum tube 70 having an anode 72, a cathode 74, a control grid 76, a screen grid 78, and a suppressor grid 80. The anode 72 is connected through an anode resistor 82 to the positive terminal of a D.-C. power supply, for example, the terminal 52. The cathode 74 is connected through a variable resistor 84 to the grounded terminal 42 of the power supply 52. The resistor 84 is provided with a slider or variable tap 86, connected by a lead 88 to ground, so that variation of this slider short-circuits a variable portion of the lower end of the resistor 84.

The cathode 74 is also connected through a resistor 90 to a positive D.-C. source of voltage at a terminal 92. The potential of the cathode is therefore positive with respect to ground and with respect to the grid 76. As can be seen, the potential of the cathode is determined primarily by the voltage-dividing effect of the resistor 90 and the effective portion of the resistor 84.

The screen grid 78 is connected to a positive voltage, as by a connector through a resistor 91 to the terminal 52.

The suppressor grid 80 is connected to the cathode.

The control grid 76 is connected to the grounded terminal 42 through a resistor 93, and is also coupled through a blocking condenser 94 to the anode 44 of the tube 43.

The tube 70 is normally cut off, in the absence of a void between the electrodes 10 and 12. When a void occurs, of sufficient size that it is desired to detect it, there is produced on the condenser 62, and hence on the grid 76, a rising sawtooth voltage great enough to cause the tube 70 to conduct.

There is provided a tube 96 having its anode 98 connected in series with a winding 100 of a relay, and a resistor 102. The upper end of the resistor 102 is connected to a positive D.-C. voltage source at the terminal 92. The tube 96 also has a grounded cathode 104 and a grid 106.

A resistor 108 is connected between the grid 106 and the grounded cathode. In parallel with this resistor there is connected a condenser 110, which tends to sustain pulses applied to the grid 106 long enough so that the armature 112 can respond. The grid 106 is coupled to the anode 72 of the tube 70 through a blocking condenser 111.

The tube 96 is normally in a heavily conducting condition, thereby energizing the relay winding 100, and as a consequence the armature 112 of the relay is held down, away from its contact 114. This armature is spring-biased up, toward that contact.

When the tube 70 conducts, there is applied to the grid 106 a negative pulse which cuts off the tube 96 and releases the relay. The armature 112 then is moved by its spring tension upward to the contact 114 and completes a circuit from a lead 118 through the armature 112 to a lead 120. The leads 118 and 120 are connected to output means 122 including an indicator. The output means may comprise a recording voltmeter, a light, horn, bell, drive-control, or other recording, alarm, or control apparatus, together with a source for energizing the same when the armature 112 connects the leads 118 and 120 together.

In operation of the apparatus, the sheet material 14 advances rapidly between the rotating roller 10 and the brush electrode 12. Because the material 14 is of a dielectric type, the impedance between the brush electrode and the roller is very high. There will necessarily be a very small amount of leakage from the electrode 12 through the sheet material to the electrode 10, even in the absence of voids. In addition, as the dielectric material advances between the brush electrode and the roller electrode, a small charging current flows through the circuit including these electrodes. Because of these two effects there will consequently be a very small current flowing from the positive terminal 40 through the resistor 38. Minor variations in the sheet material will cause minor variations in this current and hence in the voltage appearing across the terminals 60 and 42. It is desired that the system ignore such minor variations, and it does. The slider 86 is adjusted so that only voids of a predetermined size or larger can turn on the tube 70 and will be detected.

When a void or hole passes between a bristle of the brush electrode 12 and the roller electrode 10, the bristle reaches through the void and contacts the roller electrode 10. This causes an abrupt decrease in the impedance between the terminals 60 and 42, and causes a pulse of current through the resistor 38, and hence a negative voltage pulse is applied between the grid 56 and the cathode 46. The leading edge of the pulse corresponds to the moment when the bristle engages the electrode 10, and the trailing edge of the pulse corresponds to the moment when the back edge of the void reaches the bristle and contact is broken between the bristle and the electrode 10.

The negative pulse cuts off the tube 43. This causes the condenser 62 to charge from the positive source 52 through the resistor 50. When the trailing edge of the pulse occurs, the tube 43 is turned on again, and this quickly returns the condenser 62 to a substantially discharged condition. Thus, across the condenser 62 there appears a sawtooth-shaped voltage, the amplitude or peak value of which depends upon the duration of the negative pulse on the grid 56, and hence on the size (length, longitudinally of the sheet) of the void passing under the bristle. It will be seen that a negative pulse on the grid 56 which cuts off the tube 43 will produce the same size sawtooth variation on the condenser 62 as will a pulse having the same duration but greater amplitude. Hence, in this respect, the sawtooth variation is independent of the amplitude of the negative pulses on the grid 56. The peak value of the sawtooth is therefore an accurate measure of such voids.

Conducting particles sensed by the brush electrode 12 will produce voltage effects generally similar to those produced by voids.

The sawtooth variation on the condenser 62 is applied to the grid of the normally-cut-off tube 70. Provided the void is larger than the predetermined size which the apparatus is adjusted to detect, the sawtooth variation will be great enough to turn on the tube 70, which is normally biased off. As a result, there is produced a negative voltage variation on the anode 72, which is applied to the grid 106 of the tube 96, cutting off this tube, which normally conducts heavily. When the tube 96 cuts off, the relay winding 100 releases its armature 112, which is spring-urged toward the contact 114. This completes a circuit from the lead 118, the contact 114, the armature 112, the terminal 116, and the lead 120, and energizes the alarm-actuating and indicating means 122.

Adjustment of the slider 86 varies the bias on the tube 70, and enables the detection of voids of a predetermined size and the ignoring of those smaller than that size. To detect smaller voids, the slider 86 is moved upward so that the effective negative grid-to-cathode potential difference will be smaller.

In the illustrative embodiment, whether a void is "indicated" is determined by whether the sawtooth voltage on the condenser 62 produces a large enough decrease in current in the relay winding 100 to cause the armature 112 to engage the contact 114. With some adjustments, some voids might cause the tube 70 to conduct but not produce a sufficient decrease in current through the tube 96 and the winding 100 to cause the armature 112 to engage the contact 114. In any event, adjustment of the slider 86 provides the desired size control.

From the above description it may be seen that the resistor 50 and the condenser 62, with their voltage source and switch tube 43, serve as a sawtooth generator. The stages including the tubes 70 and 96 serve as voltage-controlled actuating means for actuating the indicator 122.

In some embodiments it is desired to detect voids so small that the bristles of the brush 12 cannot extend through the voids to the roller 10. If so, a much higher D.-C. voltage may be used at the terminal 40 than would otherwise be used, and when such a tiny void then passes between a bristle and the roller 10, an arc of current will pass through the void, between the bristle and the roller 10. This produces a negative pulse which can be detected in the manner heretofore described, by appropriate adjustment of the slider 86.

If it is desired in some arrangements to detect very thin spots in the dielectric material, a very high D.-C. voltage may be supplied at the terminal 40, and then when a bristle senses such a very thin spot in the dielectric material, an arc of current will pass from the bristle through the dielectric material itself to the roller 10. A negative pulse is again produced, which may be detected in the manner which has been described.

Figure 2:
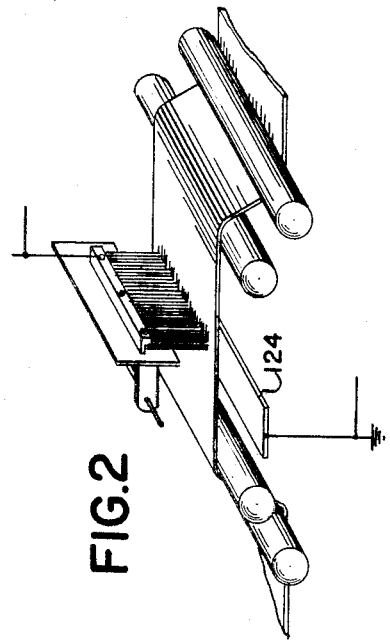
Figure 2 is a perspective view of another embodiment of the sensing electrodes.

In Figure 2 is shown an electrode arrangement which may sometimes be used to advantage instead of that of Figure 1. Figure 2 differs from Figure 1 in that, for the lower electrode, instead of a roller, there is used a metallic plate 124.

Illustrative values for the various circuit components, suitable in certain embodiments of the invention, are:

Resistors: Ohms
38 ---- 2,200,000
50 ---- 50,000
54 ---- 470,000
82 ---- 330,000
84 (total) ---- 100,000
90 ---- 220,000
91 ---- 100,000
93 ---- 3,900,000
102 ---- 68,000
108 ---- 1,000,000

Condensers Microfarads
58 ---- 0.01
62 ---- 0.10
94 ---- 0.10
110 ---- 0.05
111 ---- 0.10

Voltages: Volts
40 ---- +50
52 ---- +300
92 ---- +300

Tubes:
96 ---- Type 6C4.
42 ---- Pentode section of type 6U8.
70 ---- Triode section of type 6U8.

It will be understood that these specific values are illustrative, and in various instances components having other values may be employed, while still retaining the mode of operation described herein.

The apparatus which has been described has excellent operating characteristics, and is capable of detecting voids only if they extend along the sheet a distance greater than a selected value, while ignoring certain characteristics of the advancing material. It may be observed that the direct-current-type sensing circuit, in combination with the A.-C. coupled amplifying and controlling circuits, causes the apparatus to be insensitive to the absolute thickness of the material, or to slow changes in the thickness. Furthermore, the apparatus may be adjusted to ignore bumps in the material. When thus adjusted, it responds only to an abrupt decrease in the resistance between the sensing electrodes to a very low value, approximating a short circuit, and to the maintaining of this very low resistance long enough to cause the sawtooth voltage to exceed the threshold value established by the adjustable "size-control" element, so as to actuate the indicator or alarm. The clipping action provided by the biased-off stage between the sensing electrodes and the sawtooth generator aids in assuring that the size-control element functions to cause the apparatus to indicate only voids and conducting particles greater than the selected size.

While an illustrative form of the invention has been disclosed in considerable detail, it will be understood that various changes may be made in the construction and arrangement of the several parts without departing from the general principles and scope of the invention as defined by the appended claims.

I claim:

1. Apparatus for detecting voids and conducting particles in advancing sheet material, comprising a pair of opposed electrodes for yieldably engaging opposite surfaces of said material as it advances, one of said electrodes including portions which may extend through a void in said material and engage the other electrode, circuit means including said electrodes and a voltage source for generating voltage pulses having a duration determined by the length of said void sensed by said electrodes, voltage-modifying means coupled to said circuit means for generating voltage variations the amplitude of which is determined by the duration of said voltage pulses, said last-mentioned means including a pulse-clipping device having an input circuit, a condenser coupling said input circuit to said circuit means, and a charging condenser responsive to said pulse-clipping device, and output circuit means including an indicating device, coupled to said voltage-modifying means, said output circuit means being responsive to said voltage variations only if greater than a predetermined amplitude.

2. Apparatus for detecting voids and conducting particles in rapidly advancing dielectric sheet material, comprising a pair of opposed electrodes for yieldably engaging opposite surfaces of said material as it advances, one of said electrodes comprising a metallic brush including bristles for extending through said voids and engaging said other electrode, a source of D.-C. voltage and a resistor connected in series with said electrodes, for generating negative voltage pulses across said electrodes when voids are conducting particles are engaged by said electrodes, a sawtooth generator including a D.-C. voltage source, a resistor, and a condenser, connected in series, and a normally-conducting switch tube connected in parallel with said condenser, a coupling condenser applying said negative voltage pulses to an input electrode of said switch tube, for cutting it off and generating sawtooth voltage variations across said condenser having a duration determined by the length of said voids or conducting particles, said condenser blocking D.-C. voltage at said electrodes from reaching said input electrode of said switch tube, an indicating device, means including a biased-off amplifier responsive to only said sawtooth voltage variations having an amplitude greater than a threshhold value, for actuating said indicating device when voids or conducting particles greater than a predetermined length pass between said electrodes, and adjustable means for increasing the bias on said amplifier, for increasing the threshhold value of the sawtooth variations required to actuate said indicating device, whereby said adjustable means comprises a "size control."

3. Apparatus for detecting voids and conducting particles in rapidly advancing sheet material, comprising a backing electrode; a brush electrode including a plurality of metallic bristles urged toward said backing electrode, whereby said sheet material may be advanced between said electrodes; an indicator; voltage-controlled actuating means for actuating said indicator; a source of D.-C. voltage and a resistor connected in a series circuit with said electrodes, whereby the sensing of a void in said material by said electrodes produces a voltage pulse in said series circuit; a sawtooth generator circuit for generating a sawtooth voltage having a fixed rate of rise; means including an A.-C. coupling device adapted to reject D.-C. components and a pulse-clipping device connected in that order between said series circuit and said sawtooth generator circuit for controlling the same in response to pulses but not D.-C. conditions in said series circuit; and means for applying said sawtooth voltage to said voltage-controlled actuating means, said last-mentioned means being adapted to actuate said indicator in response to said sawtooth voltage only if greater than a predetermined amplitude, said pulse-clipping device being adapted to clip the magnitude of the individual voltage pulses produced by individual voids in said material and being adapted to prevent variations in the amplitude of said voltage pulses produced in said series circuit by said voids from affecting the rate of rise of said sawtooth voltage, whereby individual voids in said material produce individual sawtooth voltage variations having an amplitude determined by the length of said void, but independent of the steady current through said series circuit, so that said indicator is actuated once in response to each void passing between said electrodes which has a longitudinal extent greater than a predetermined size, but smaller voids are unable, individually and cumulatively, to actuate said indicator.

4. Apparatus for detecting voids and conducting particles in advancing dielectric sheet material, comprising a pair of opposed electrodes for yieldably engaging opposite surfaces of said material as it advances, one of said electrodes comprising a metallic brush, circuit means, including impedance, applying a D.-C. voltage to said electrodes, whereby voids and conducting particles in said material passing between said electrodes produce a transient voltage variation across said electrodes, a switching and clipping device having a control electrode coupled through a blocking condenser to said electrodes, a condenser connected in a charging circuit controlled by said device for generating a sawtooth voltage having its amplitude determined by the duration of said voids and conducting particles, an output circuit for receiving said sawtooth voltage, including at least one biased-off repeater stage, for discriminating against voltage variations less than a predetermined magnitude, output means in said output circuit, responsive to the "on" conditions of said biased-off repeater, and size control means for adjusting the bias on said biased-off repeater, said switching and clipping device being adapted to start and stop the generation of said sawtooth voltage in response to the beginning and end of individual voids in said material and being adapted with said blocking condenser to prevent variations in the condition of said sheet material passing between said electrodes from causing variations in the rate of rise of said sawtooth voltage, whereby said output means is actuated each time there passes between said electrodes a void having a longitudinal extent greater than a critical value determined by said size-control means.

5. A detector for voids and conducting particles in rapidly advancing dielectric sheet material, comprising in combination, a source of D.-C. voltage, a resistor, a backing electrode and a fine-bristled metallic brush electrode, connected in series, the tips of the bristles of said last-mentioned electrode being urged toward said backing electrode, for engaging dielectric sheet material rapidly advancing between said electrodes, a circuit comprising a resistor and a condenser, connected in series, means applying a D.-C. voltage across said circuit, a normally-conducting switching and clipping tube connected in parallel with said condenser and having a control electrode, means including a blocking condenser for applying to said control electrode voltage pulses appearing across said electrodes, in such sense that when a void or a conducting particle in said dielectric material passes between said electrodes, a negative pulse is applied to the control electrode of said tube, so as to cut it off, whereby there appears across said first-mentioned condenser a generally sawtooth voltage the amplitude of which is responsive to the duration of voltage pulses across said electrodes but independent of the normal steady current through said electrodes, an indicating device, and output means connected to said first-mentioned condenser for shifting said indicating device to an alarm condition in response to said sawtooth variations only if greater than a predetermined amplitude, for indicating only voids greater than a predetermined size, whereby said blocking condenser and said switching and clipping tube cause said apparatus to be insensitive to noise-type and ambient variations in the voltage appearing on said bristles but sensitive to individual voids and conducting particles greater than a predetermined size.

References Cited in the file of this patent

UNITED STATES PATENTS

| 2,220,489 | Lowkrantz | Nov. 5, 1940 |
| 2,701,336 | Anderson | Feb. 1, 1955 |

OTHER REFERENCES

Reintjes Principles of Radar, third edition. McGraw-Hill, page 70, Fig. 10.

UNITED STATES PATENT OFFICE

CERTIFICATE OF CORRECTION

February 10, 1959

Patent No. 2,873,425

William H. Huggins

It is hereby certified that error appears in the printed specification of the above numbered patent requiring correction and that the said Letters Patent should read as corrected below.

Column 3, line 53, for "connector" read -- connection --; column 6, line 7, in the tabulation under the heading "Tubes", for "96" read -- 43 --; line 8, for "42" read -- 70 --; line 9, for "70" read -- 96 --; line 73, for "are", first occurrence, read -- or --.

Signed and sealed this 29th day of September 1959.

(SEAL)
Attest:
KARL H. AXLINE
Attesting Officer

ROBERT C. WATSON
Commissioner of Patents